Patented Mar. 10, 1931

1,796,265

UNITED STATES PATENT OFFICE

HERMANN FREUDENBERG AND HARRY KLOEPFER, OF FRANKFORT-ON-THE-MAIN, GERMANY, ASSIGNORS TO DEUTSCHE GOLD & SILBER SCHEIDEANSTALT, VORMALS ROESSLER, OF FRANKFORT-ON-THE-MAIN, GERMANY, A CORPORATION

PROCESS OF MANUFACTURE OF ALKALI-METAL HYDRIDES

No Drawing. Application filed August 23, 1927, Serial No. 214,986, and in Germany August 23, 1926.

The invention relates to a process for the manufacture of alkali metal hydrides, for instance sodium hydride.

Hitherto the preparation of alkali metal hydrides has been possible only on a small scale, for instance by following the directions given by Moissan, who conducted hydrogen over fused sodium metal at a temperature of about 350° C. On the surface of the sodium melt sodium hydride is formed which subsequently is separated from the metal by treatment with liquid ammonia. By this method, however, a few grams only of the desired product are obtainable.

According to our invention alkali metal hydride is prepared on a technical scale by treating alkali metal in a finely divided state at an elevated temperature, for instance above 200° C. with hydrogen. The fine state of distribution of the alkali metal may be attained for instance by spraying the fused metal by means of suitable nozzles either alone or with the aid of gases which do not interfere with the process, for instance with hydrogen, or by distributing the metal over and in a pulverulent solid diluting agent. Such materials may be used as diluent as do not cause any undesired secondary reactions and as are still solid at the temperatures employed. Materials of this kind are for instance common salt, iron powder, soda, wood charcoal and the like. According to one form of carrying our invention into effect the alkali metal hydride itself is used as diluting agent. The alkali metal may be distributed in the diluting agent in order to attain a fine state of division for instance by grinding the alkali metal at ordinary temperature with the diluent for instance in a ball mill. During the grinding the access of air or oxygen respectively has to be avoided in order to prevent oxidation of the finely divided alkali metal, which naturally oxidizes with great rapidity. This may be effected for instance by carrying out the grinding in an inert atmosphere, filling the mill for instance with nitrogen or passing a current of hydrogen through it.

In using common salt as diluting agent and metallic sodium as alkali metal we take for instance a proportion of 90 parts sodium chloride to 10 parts metallic sodium whilst with sodium hydride as diluting agent we may take as much as 20 parts sodium, distributed in 80 parts sodium hydride. The proportion of the alkali metal to the diluting agents depends chiefly on the condition that the mixture should have at the elevated temperature the appearance of a dry powder and not be in a sticky or pasty state.

The diluting agent may also be mixed with the alkali metal at a temperature above the melting point of the latter. In this case the alkali metal should be agitated thoroughly with the pulverized distributing material heated to temperatures well above the melting point, until the proper state of division and distribution is obtained.

The mixture of alkali metal and diluting material is then transferred into a suitable reaction chamber, where hydrogen is passed over the mixture at temperatures between 200–300° C., a favorable temperature being for instance 250° C., until the absorption of the hydrogen comes to an end and substantially the whole of the metallic alkali is converted into alkali metal hydride. The hydrogen is preferably subjected to a previous drying operation in the well known way, for instance by passing it through sulfuric acid scrubbing towers.

Example 1

90 parts of sodium chloride are ground with 10 parts of metallic sodium in a ball mill filled with nitrogen, until a uniform pulverulent mixture is obtained. This mixture is charged into a suitable reaction chamber which is filled with nitrogen and after being charged is heated from outside. In the meantime dried hydrogen is passed into the reaction chamber. The gas is taken up readily at the beginning the reaction starting as soon as the temperature reaches about 180–200° C. The temperature is kept at 250° C. while the introduction of the hydrogen is continued. Gradually the adsorption of the hydrogen gas grows sluggish and finally ceases altogether. The burners are then shut off and the mass is allowed to cool, the sodium being completely converted into hydride. The mixture containing about 10% of sodium hydride already is then used for grinding it again with metallic sodium. The mixture thus prepared is once more subjected to the action of hydrogen and so on.

In this manner we start with a mixture of alkaline metal with any diluting agent whatever, gradually increase its contents of alkali metal hydride by adding fresh alkali metal to the reaction product and treating it in the way described with hydrogen. Thus we ultimately obtain an alkali metal hydride which is practically free from foreign diluting agents.

Instead of mixing the alkali metal with the diluting agent as a separate step of our process we can combine the transformation of the alkali metal into a state of fine division by distributing it in a diluting agent and the adsorption of hydrogen by passing the hydrogen in a suitable way into the vessel, where the conversion into a finely divided state is achieved, for instance a ball mill and heating the latter to the requisite temperature of 200 to 300° C.

*Example 2*

A rotary tube is set up with a slight inclination. It is provided at the partition closing its upper end with a hopper which allows to feed in fresh material and an outlet pipe for the excess gas. The lower end is closed by a stationary lid which carries a pipe for passing hydrogen into the tube and a hopper for discharging the finished product. The rotary tube is heated in a suitable way for instance by means of gas burners, the temperatures being controlled by thermo-couples. The rotary tube is filled with nitrogen, charged with sodium hydride and heated to about 200° C. whilst hydrogen is allowed to pass into the tube. As soon as the temperature is attained metallic sodium is introduced through the top end hopper in small amounts. We found it useful to squirt a thin stream of fused sodium into the revolving tube. The temperature is then raised to about 250° C. The current of hydrogen is adjusted in such a manner that almost the whole is absorbed by the molten sodium metal. By adjusting inclination of the rotary tube, speed of the revolution, rate of hydrogen current and addition of sodium accordingly we are able to convert the sodium on its downward way completely and to discharge at the lower end practically pure sodium hydride, thus carrying out the manufacture in a continuous process.

It is advantageous to provide for suitable scraping devices inside the revolving tube as its contents are apt to stick to the walls. A few loose iron bars some times suffice to remove the crusts formed.

*Example 3*

Another way of carrying our process into effect is to prepare a mixture of alkali metal and diluting agent for example by grinding 20 parts of sodium metal with 80 parts of sodium hydride in the cold with the aid of a ball mill, which is filled with hydrogen. The readily prepared mixture is fed onto a conveyor belt, made for instance of steel which runs through a chamber into which dry hydrogen is conducted. The belt with the mixture is heated in a suitable way to about 250° C. for instance by means of electric heating devices. The hydrogen may be passed advantageously over the mixture, while the belt moves in the opposite direction thus producing a counter current system. The conveyor belt is moved at such a rate that the mixture reaches the end of the reaction room, when the metallic sodium is transformed entirely into sodium hydride. A suitable scraping device removes it here from the conveyor belt. The finished product may be withdrawn from the reacting chamber either continuously or discontinuously. The heat which is necessary for attaining the temperature favorable for the reaction may partially or completely be introduced by the current of hydrogen which is heated previously to the requisite temperature.

Instead of using pure hydrogen mixtures or hydrogen with other gases or vapors may be utilized which do not disturb the reaction.

The alkalai metal hydrides produced in accordance with our invention may be used for the preparation of chemical products, in alloying, for metallurgical purposes, etc.

What we claim is:

1. A process for the manufacture of alkali metal hydrides which consists in subjecting finely divided alkali metal to the action of hydrogen at temperatures between about 180° C. and 300° C.

2. A process for the manufacture of alkali metal hydrides which consists in subjecting finely divided alkali metal to the action of hydrogen at about 250° C.

3. A process for the manufacture of sodium hydride, which consists in subjecting finely divided metallic sodium to the action of hydrogen at temperatures between about 180° C. and 300° C.

4. A process for the manufacture of alkali metal hydrides which consists in subjecting finely divided alkali metal in the presence of solid distributing agents to the action of hydrogen at temperatures between about 180° C. and 300° C.

5. A process for the manufacture of alkali metal hydrides which consists in distributing alkali metal in a pulverulent diluting agent and subjecting the mixture to the action of hydrogen at temperatures between about 180° C. and 300° C.

6. A process for the manufacture of alkali metal hydrides which consists in grinding alkali metal together with a solid distributing agent in an inert atmosphere and subjecting the pulverulent mixture to the action of hydrogen at temperatures between about 180° C. and 300° C.

7. A process for the manufacture of sodium hydride which consists in distributing metallic sodium in a finely divided diluting agent and treating the mixture with hydrogen at temperatures between about 180° C. and 300° C.

8. A process for the manufacture of sodium hydride which consists in grinding metallic sodium with sodium hydride as distributing agent and subjecting the mixture to the action of hydrogen at temperatures between about 180° C and 300° C.

9. A process for the manufacture of sodium hydride which consists in grinding metallic sodium with sodium hydride as solid distributing agent and subjecting the mixture to the action of hydrogen at 250° C.

10. A process for the manufacture of alkali metal hydrides which consists in adding alkali metal to a solid distributing agent and distributing said alkali metal therethrough while simultaneously heating the mixture with hydrogen to temperatures between about 180° C. and 300° C.

11. A process for the manufacture of alkali metal hydrides which consists in adding alkali metal to a solid distributing agent and distributing said alkali metal therethrough while simultaneously heating the mixture with hydrogen to about 250° C.

12. A process for the manufacture of sodium hydride which consists in adding metallic sodium to a solid distributing agent and distributing said sodium therethrough while simultaneously heating the mixture with hydrogen to temperatures between about 180° C. and 300° C.

13. A process for the manufacture of sodium hydride which consists in adding metallic sodium to sodium hydride and distributing said sodium in finely divided form throughout the sodium hydride while simultaneously subjecting the mixture to the action of hydrogen at temperatures between about 180° and 300° C.

14. A process for the manufacture of sodium hydride which consists in adding metallic sodium to a solid distributing agent and distributing said sodium therethrough while simultaneously heating the mixture with hydrogen to about 250° C.

15. A process for the manufacture of sodium hydride, comprising adding metallic sodium to sodium hydride and distributing said sodium throughout the sodium hydride while simultaneously moving the resulting mixture away from the point of introduction of the metallic sodium and subjecting the mixture to a counter current flow of hydrogen at temperatures between about 180° and 300° C.

16. A process for the manufacture of sodium hydride comprising adding metallic sodium to sodium hydride and distributing said sodium throughout the sodium hydride while simultaneously moving the resulting mixture away from the point of introduction of the metallic sodium and subjecting the mixture to a counter current of pre-heated hydrogen at about 250° C.

Signed at Frankfort-on-the-Main, in the country of Germany and State of Hesse-Nassau, Prussia, this sixth day of August, A. D. 1927.

HERMANN FREUDENBERG.
HARRY KLOEPFER.